US009296900B2

(12) United States Patent
Münchow

(10) Patent No.: US 9,296,900 B2
(45) Date of Patent: Mar. 29, 2016

(54) SURFACE-MODIFIED INORGANIC FILLERS AND PIGMENTS

(75) Inventor: Dieter Münchow, Köln (DE)

(73) Assignee: Alpha Calcit Fullstoff Gesellschaft mbH, Cologne (DE)

( * ) Notice: Subject to any disclaimer, the term of this patent is extended or adjusted under 35 U.S.C. 154(b) by 1104 days.

(21) Appl. No.: 11/596,119

(22) PCT Filed: May 10, 2005

(86) PCT No.: PCT/EP2005/052112
§ 371 (c)(1),
(2), (4) Date: Feb. 16, 2007

(87) PCT Pub. No.: WO2005/111153
PCT Pub. Date: Nov. 24, 2005

(65) Prior Publication Data
US 2007/0240619 A1 Oct. 18, 2007

(30) Foreign Application Priority Data

May 12, 2004 (DE) .......................... 10 2004 023 864
May 21, 2004 (DE) .......................... 10 2004 025 008

(51) Int. Cl.
*C09C 1/00* (2006.01)
*C09C 1/02* (2006.01)
(Continued)

(52) U.S. Cl.
CPC ................. *C09C 1/021* (2013.01); *C09C 3/006* (2013.01); *C09C 3/10* (2013.01); *D21H 17/67* (2013.01);
(Continued)

(58) Field of Classification Search
CPC ....................................................... C09C 3/006
USPC ............................................................ 427/221
See application file for complete search history.

(56) References Cited

U.S. PATENT DOCUMENTS 3,839,064 A * 10/1974 Vincent .......................... 523/201
3,925,096 A * 12/1975 Karkov ............................ 524/88
(Continued)

FOREIGN PATENT DOCUMENTS

DE 2344388 3/1975
DE 3839900 5/1990
(Continued)

OTHER PUBLICATIONS

National Industrial Chemicals Notification and Assessment Scheme for Styrene-Acrylate Copolymer, Jan. 30, 1991.*

*Primary Examiner* — Alex A Rolland

(57) ABSTRACT

The invention relates to a method for producing surface-modified inorganic fillers or pigments of a desired particle size. Said method is characterized in that filler or pigment slurries of inorganic fillers or pigments are milled to the desired particle size under the action of compressive and shear forces using polymer dispersions, whereby the fillers and/or pigments are additionally brought into contact with conventional milling auxiliary agents and/or dispersants (active agent) in a quantity of between 0.1 and 2.0 wt. %, in relation to the fillers or pigments. The invention also relates to the fillers and pigments that are obtained by said method and to their use for producing dispersion inks, adhesives, coatings or coating compounds for the paper industry, in particular coating compounds used in various industry segments, such as sheet fed offset printing, roll offset printing, gravure printing and for the production of cardboard and special papers.

8 Claims, 1 Drawing Sheet

(51) Int. Cl.
*C09C 3/00* (2006.01)
*C09C 3/10* (2006.01)
*D21H 17/67* (2006.01)

(52) U.S. Cl.
CPC ......... *C01P 2004/51* (2013.01); *C01P 2004/61* (2013.01); *C01P 2004/62* (2013.01); *C01P 2006/22* (2013.01)

(56) References Cited

U.S. PATENT DOCUMENTS

| | | | |
|---|---|---|---|
| 3,953,487 A | | 4/1976 | Kratel et al. |
| 4,683,285 A | | 7/1987 | Paar et al. |
| 4,812,510 A | * | 3/1989 | Barnett et al. ............... 524/807 |
| 5,057,151 A | | 10/1991 | Schuster et al. |
| 5,228,912 A | | 7/1993 | Herget et al. |
| 5,268,197 A | * | 12/1993 | Pons et al. ................... 427/221 |
| 5,605,568 A | * | 2/1997 | Naydowski et al. .......... 106/464 |
| 5,910,214 A | | 6/1999 | You |
| 6,214,166 B1 | * | 4/2001 | Munchow .................... 162/189 |
| 2004/0077762 A1 | * | 4/2004 | Mongoin et al. .............. 524/430 |

FOREIGN PATENT DOCUMENTS

| | | |
|---|---|---|
| DE | 4312463 | 7/1994 |
| DE | 69303877 | 3/1997 |
| DE | 19821089 | 11/1999 |
| DE | 10209448 | 9/2002 |
| DE | 10209448 | 9/2003 |
| EP | 0515928 | 5/1992 |
| EP | 0595723 | 10/1993 |
| EP | 0595723 | 7/1996 |
| WO | WO93/11183 | 6/1993 |
| WO | WO93/12184 | 6/1993 |
| WO | WO98/01621 | 1/1998 |
| WO | WO98-01621 | 1/1998 |
| WO | WO2004-026973 | 4/2004 |
| WO | WO2005/111153 | 11/2005 |

* cited by examiner

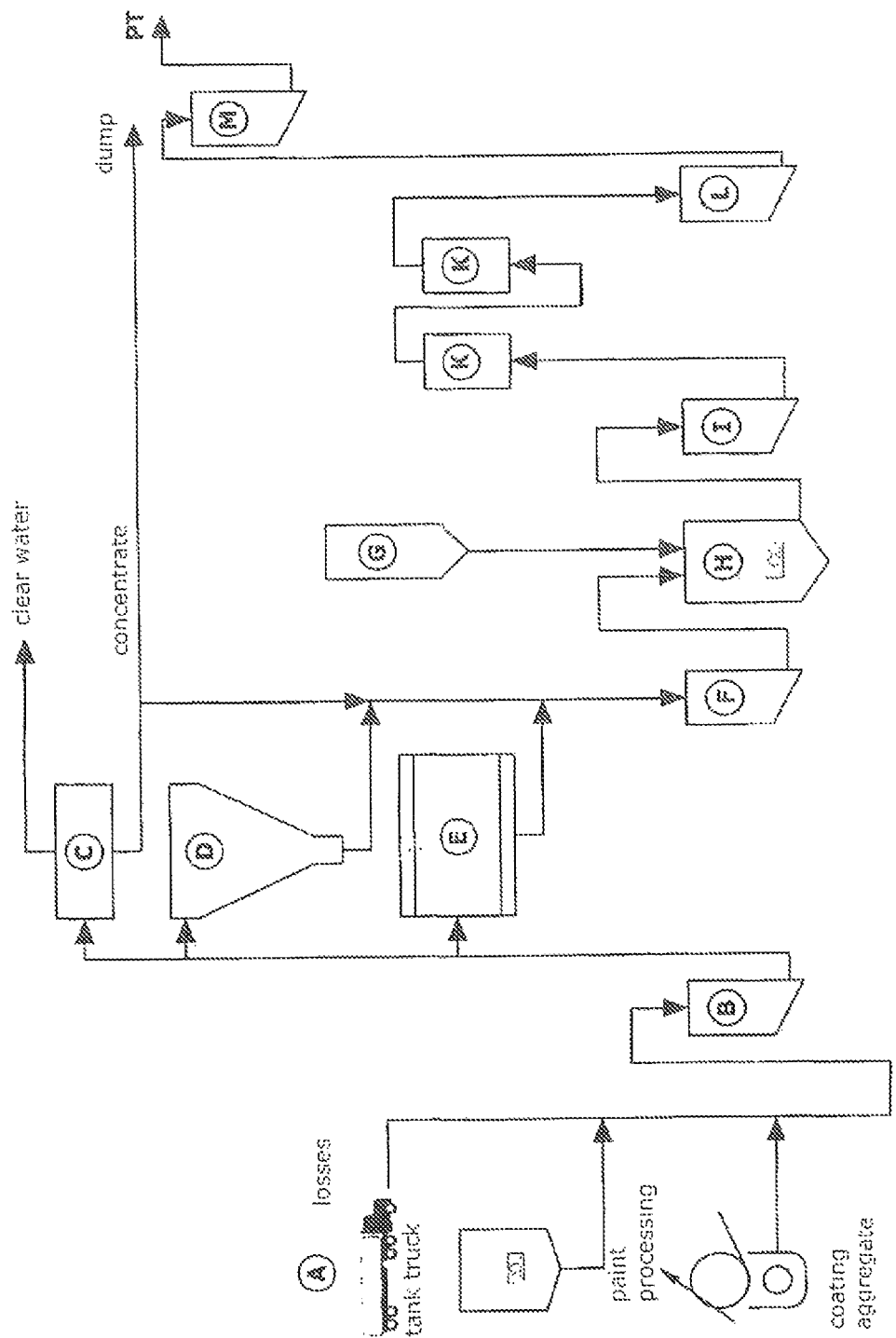

SURFACE-MODIFIED INORGANIC FILLERS AND PIGMENTS

BACKGROUND

The invention relates to a process for the preparation of surface-modified inorganic fillers and pigments of a defined grain size, the thus obtained fillers and pigments, and the use thereof.

In many fields of technology, inorganic pigments or fillers are bound with binders in the form of polymer dispersions, for example, in the preparation of dispersion paints, adhesives or paper.

EP 0 515 928 B1 relates to surface-modified platelet-like pigments with improved repulping behavior, and a process for the preparation thereof, and the use thereof. Said platelet-like pigments, for example, platelet-like metals, metal oxides, mica pigments and other platelet-like substrates, are coated with a polyacrylate or polymethacrylate or their water-soluble salts and optionally a solvent or mixture of solvents in a mixing vessel with stirring.

For example, in the preparation of paper, a large amount of fillers is employed. Almost all papers are admixed with fillers, which provide a uniform formation, better softness, whiteness and grip to printing and writing papers, in particular.

Natural printing papers (uncoated papers) contain up to 35% by weight of fillers, coated papers contain from 25 to 50% by weight of fillers. The amount of fillers is highly dependent on the intended use of the paper. Heavily loaded papers have lower strengths and a poorer sizing capability.

The filler content in the paper composition is usually from 5 to 35% by weight and consists of primary pigments or recirculated coating pigments which may be derived from residual coats or coated rejects. In addition to the whiteness of the filler, which is important for fluorescent whitened paper, the grain size plays an important role, because it highly influences the filler yield and the physical properties of the paper, especially its porosity. The filler content remaining in the paper is from 20 to 80% by weight of the amount added to the fiber suspension. The yield depends on both the type of filler and the composition of matter, the degree of milling, the fixing of the filler particles by resin and aluminum sulfate, the basis weight, the speed of the paper machine, the way of water withdrawal, and the fineness of the screen.

As judged by their consumption, the following products have rather great importance today as fillers and coating pigments: china clay, calcium carbonate, artificial aluminum silicates and oxide hydrates, titanium dioxide, satin white, talcum and calcium silicate.

EP 0 595 723 B1 describes a process for the preparation of mineral-based loading pigments, characterized in that a co-milling of a compacting mineral, a lamellar mineral and/or a plastic pigment in performed in aqueous medium in the presence of at least one milling aid comprising at least one dispersing agent. However, this document remains too vague with respect to the conditions in the co-milling of mineral and plastic pigment and fails to mention the use of dispersing agents.

WO 98/01621 describes a process for the reuse of fillers and coating pigments from the preparation of paper, paperboard and cardboard from the residual water sludges from coating plant waste waters, drinking plants, internal water treatment plants or separators, and the use of a thus obtained pigment slurry for the preparation of a coating composition for the paper industry, or for use in the paper stock for paper-making. An essential element of the invention is a process for reusing fillers and coating pigments from the preparation of paper, paperboard and cardboard from the residual water sludges from coating plant waste waters, drinking plants, internal water treatment plants or separators which is characterized in that said residual water sludges containing fillers and coating pigments are subjected to mixing and subsequently milling to form a pigment slurry with fresh pigment or fresh filler as powders, slurry containing fresh pigment and/or slurry containing fresh filler.

SUMMARY

The object of the present invention is to improve the contact of inorganic fillers and pigments and binders in the form of polymer dispersions and thus to reduce the necessary amount of binders or to improve the binding of the fillers or pigments to one another and to the substrate, for the preparation of filler or pigment slurries, especially in paper industry and further fields of application, such as the paint industry or adhesive industry.

According to the invention, it has been found that inorganic pigments of a defined grain size whose surface is coated with binders during milling, referred to as polymer dispersions in the following, can be advantageously employed in many fields of technology, for example, in paper industry and paint industry or adhesive industry.

Accordingly, a first embodiment of the present invention is a process for the preparation of surface-modified inorganic fillers or pigments of a desired grain size, characterized in that filler or pigment slurries of inorganic fillers or pigments are milled to the desired grain size with the action of pressure and shear forces using polymer dispersions, said fillers and/or pigments being further contacted with per se known milling aids and/or dispersing agents (active ingredient) in an amount of from 0.1 to 2.0% by weight, based on the fillers or pigments.

DRAWINGS

The drawing described herein is for illustrative purposes only of selected embodiments and not all possible implementations, and is not intended to limit the scope of the present disclosure.

FIG. 1 shows a schematic view of a process used in the production of surface-modified inorganic fillers and pigments.

Corresponding reference numerals indicate corresponding parts throughout the drawing.

DETAILED DESCRIPTION

It has been found that polymer dispersions, which usually should have an adhesive effect, are suitable for providing inorganic fillers and pigments in a form which provides an increased binding capability as compared to fillers and pigments of the same grain size distribution known from the prior art if binders are contacted with surfaces of inorganic fillers and pigments during the milling of said fillers and pigments to give the desired grain size. The binders may be derived from materials to be reused, for example, residual water sludges, or they may be added directly.

Surprisingly, it has been found that the polymer particles do not lead to agglutination or agglomeration of the filler particles and pigment particles, but evidently form a fine film on the surface of the fillers or pigments which have a very much improved adhesion to one another and to the substrate, for example, fibers, in the paper industry.

A particularly preferred filler or pigment for modification within the meaning of the present invention is calcium carbonate, especially natural and/or precipitated calcium carbonate.

Apart from calcium carbonate, other fillers and pigments known in the prior art may be employed, such as china clay, artificial and/or natural aluminum silicates and oxide hydrates, titanium dioxide, satin white, dolomite, mica, metal flakes, especially aluminum flakes, bentonite, rutile, magnesium hydroxide, gypsum, sheet silicates, talcum, calcium silicate and other rocks and earths.

According to the present invention, it is particularly preferred to employ the above defined fillers and pigments in an amount of from 10 to 90% by weight, especially from 30 to 70% by weight, based on the slurry, especially water.

When the fillers or pigments are applied, for example, as components of the coat in paper making, usually a high proportion of the binder migrates into the paper surface. A large proportion of the binder is absorbed in the raw paper before film formation occurs. The uppermost coating layer becomes deficient in binders, and the so-called pulling occurs. However, if the polymer binder is milled onto the filler or pigment, the migration of the binder does not occur, or only so to a small extent; i.e., the offset strength (resistance to pulling) is higher because no (or little) binder is lost by absorption. In contrast, in the prior art, the loss of binder must be compensated for by an increased binder proportion in the coat.

Polymer dispersions within the meaning of the present invention comprise the resin solids per se and their dispersions (lattices) of finely dispersed natural and/or synthetic polymers, especially in a particles size of from 0.05 to 6 μm. usually, these are in the form of aqueous or, less frequently, non-aqueous dispersing agents. These include dispersions of polymers, such as natural rubber (latex) and synthetic rubber (latex) as well as artificial resins (artificial resin dispersions) and plastic materials (plastics dispersions), such as polymerizates, polycondensates and polyaddition compounds, especially based on polyurethane, styrene/butadiene, styrene/acrylic acid or acrylate ester, styrene/butadiene/acrylic acid or acrylate ester, as well as vinyl acetate/acrylic acid or acrylate ester as well as suspensions containing acrylonitrile.

Under the product designations Basonal®, Acronal® and Styronal®, corresponding polymer dispersions are commercially available as binders for the dispersion paint industry and also for paper and cardboard coating. In the prior art, these polymer dispersions are incorporated into the filler or pigment slurries, which are usually adjusted to be neutral to alkaline, without a larger amount of shear by stirring, without a change of the grain size of the filler particles or pigment particles occurring. However, according to the present invention, these are directly contacted with the inorganic fillers and pigments by the action of pressure and shear forces. Of course, the same applies to the preparation of filler or pigment slurries, such as in the preparation of adhesives, in which no water is added separately. Under the action of pressure and shear forces during milling, surface-modified inorganic fillers and pigments are obtained which exhibit an improved binding activity as compared to the prior art. According to the present invention, it is particularly advantageous to mill the inorganic fillers or pigments wet in the presence of the polymer dispersions to the desired grain size. Thus, it is possible to provide a great variation of the whiteness and size distribution of the fillers or pigments for white fillers or pigments, and such variation can be controlled, in particular, by the way and duration of milling.

The amount of polymer dispersions which is contacted with the inorganic fillers or pigments is of some importance. Thus, according to the present invention, it is particularly preferred to contact said inorganic fillers or pigments with an amount of from 0.1 to 50%, especially from 5 to 15%, by weight of polymer dispersion (solids), based on the amount of pigment. The polymer dispersions are usually in an aqueous or non-aqueous form with a solids content of from 40 to 60% by weight, especially 50% by weight.

In addition to the polymer dispersions, according to the present invention, the inorganic fillers or pigments are further contacted with per se known dispersing agents or milling aids, especially polyacrylates. Such polyacrylates are described, for example, in the initially mentioned EP 0 515 928 B1, which is included herein by reference.

According to the present invention, the fillers or pigments are contacted with the above mentioned dispersing agent active ingredient in an amount of from 0.1 to 2.0%, more preferably from 0.2 to 0.4%, by weight, based on the solids content.

In the residual water sludges from coating plant waste waters of the paper and drinking plants, internal water treatment plants or separators, the fillers and coating pigments are frequently in an agglomerated form and with lower whiteness, which limits or even precludes a direct reuse in raw material processing, especially in paper coating.

By means of the present invention of the above described process, even when residual water sludges are employed, a defined concentrated pigment slurry or filler slurry is obtained which may be employed, for example, in the preparation of paper, paperboard and cardboard or paint and adhesive industries.

In papermaking, it is usual to employ the fillers and coating pigments either as powders or in the form of concentrated slurries with a solids content of from 50 to 80% by weight. Those fillers and pigments are usually supplied by the manufacturers with the desired whiteness and grain size distribution. Now, an essential element of the present invention resides in the use of the inorganic fillers and pigments in a kind of "basic grade", preferably as a solid or as a highly concentrated slurry, with a solids content of, for example, from 70% by weight to 85% by weight or more, and an average grain diameter of, for example, from 50% less than 1 μm to 50% less than 15 μm, especially from 50% less than 3 μm to 50% less than 8 μm, and milling in the absence of the polymer dispersion, especially in an aqueous phase, to obtain the desired grain size. Thus, in the paper industry, fresh-pigment containing slurries and/or fresh-filler containing slurries can be milled to the desired whiteness and fineness by mixing and then milling together with fresh pigments or fresh fillers in the form of powders, and then used as a filler or coating pigment. The mineral fillers and pigments mentioned are usually milled to give the desired grain size in a wet or dry milling method. In wet milling, some proportion of water is inherently required. Part or all of the water necessary for the milling of the inorganic pigments can be replaced by the residual water sludges. Agglomerates of the fillers or pigments usually present in the residual water sludges do not interfere, or only little so, since they are comminuted to the desired grain sizes in the course of the wet milling process.

The pigment and filler particles of the residual water sludge which are designated for use as fillers or pigments act as milling aids and dispersing aids to disrupt the agglomerates in the milling process. At the same time, the residual water sludge including the loaded particle acts as a dispersing aid and milling aid for the fillers and pigments in the milling process so that the otherwise usual amounts of binders, dispersing aids and milling aids can be reduced according to the invention.

Accordingly, it is particularly preferred according to the invention to adjust the residual water sludge to a solids concentration of from 0.02% by weight to 60% by weight, especially from 1% by weight to 30% by weight, for said mixing and then milling together with the polymer dispersion and fresh pigments or fresh fillers in the form of powders, fresh-pigment containing slurries and/or fresh-filler containing slurries. When the concentration is too low, the recycling process becomes uneconomical.

The ratio of fillers and/or pigments to fibers in the residual water sludges of the paper industry may vary widely. It is particularly preferred according to the present invention to use residual water sludges with an optionally increased concentration of fillers and/or pigments which is in the range of from 1% by weight to 80% by weight, especially from 20% by weight to 60% by weight, based on the solids content. Thus, both the fiber content and the content of fillers and/or pigments may vary, for example, from 2 to 98% by weight, or from 98 to 2% by weight. Of course, residual water sludges free of fibers can also be employed in the paper industry according to the invention.

By way of example, the preferred compositions of various residual or waste water sludges are set forth below. Preferably, the waste water from the production comprises from 0.5 to 5% by weight, especially 2.5% by weight, of lost substances at a special fresh water requirement of from 10 to 100 l/kg, especially 20 l/kg. The concentration of the residual water sludges is preferably from 0.02 to 5.0%, especially 1.5% by weight. Particularly preferred according to the invention is a ratio of fiber content to filler and/or pigment content of 20%:80% by weight or 80%:20% by weight, especially a ratio of fibers to pigments of 40%:60% by weight in a waste water from paper production.

Preferably, a slurry having a solids content of from 10 to 95% by weight, especially from 40 to 80% by weight, is used for milling.

This permits a flexible and quick reaction to changing quality and production requirements, for example, with respect to the different papermaking raw materials for the paper stock, the fillers or pigments or slurries for precoating, top coating and single coating or pigmentation alone, and the mixing with other fillers or pigments.

According to the present invention, per se known additives, such as wetting agents, stabilizers, milling aids and dispersing aids, may be employed during the mixing and/or milling of the inorganic fillers and pigments.

The pigment slurries obtainable according to the present invention may be employed to particular advantage in the paper industry, especially for the preparation of a coat for paper coating or in the paper stock. Particularly preferred is their use for the preparation of a coating pigment slurry for offset paper. In addition, the slurries according to the invention are also suitable for the preparation of a coating compound for light-weight coated papers, especially with high coating speeds, and for the preparation of rotary offset papers, especially for the preparation of light-weight coated rotary offset papers, the coating of cardboard and special papers, such as labels, wallpapers, silicone base paper, self-copying paper, packaging paper, and for admixture with intaglio printing paper. Thus, the coating pigment slurries obtainable according to the invention may be employed, in particular, in sheet-fed offset papers, especially for sheet-fed offset single coating, sheet-fed offset double coating: sheet-fed offset precoating and sheet-fed offset top coating; in rotary offset papers, especially for LWC rotary offset single coating, rotary offset double coating: rotary offset precoating and rotary offset top coating; in intaglio printing, especially for LWC intaglio single coating, intaglio double coating: intaglio precoating and intaglio top coating; in cardboards, especially for cardboard double coating: cardboard precoating and cardboard top coating; and for flexographic printing and special papers, especially for labels and flexible packings. The fillers and pigments according to the invention may also be employed to advantage in paper for digital printing methods.

The process offers the opportunity to employ the pigment slurries prepared according to the invention without a loss in quality in the base papers, coatings and especially final qualities prepared therewith.

The present invention may also be employed, in particular, for the preparation of adhesives. Adhesives are known to be non-metallic substances which bond together parts to be joined by adhesion and cohesiveness (cohesion). "Adhesive" is a generic term which includes other usual terms for adhesive types selected under physical or chemical aspects or aspects of processing technology, such as glue, paste, dispersion, solvent, reaction or contact adhesives. The designations of adhesives often contain additions for designating base materials (for example, starch paste, artificial resin glue, hide glue), processing conditions (for example, cold glues, hot-seal or hot-melt adhesives, joint glue), intended use (for example, paper adhesive, wood glues, metal adhesive, wallpaper paste, rubber adhesive) and form of delivery (for example, liquid adhesive, glue solution, glue powder, plate glue, glue jelly, putty, adhesive tape, adhesive film).

Adhesives are predominantly based on organic compounds, but inorganic adhesives are also employed.

DIN 16 920 standard classifies adhesive types into physically curing adhesives (glues, pastes, solvents, dispersion, plastisol and hot-melt adhesives) and chemically curing adhesives (for example, cyanoacrylate adhesives). The physically curing adhesives can be solvent-free (hot-melt adhesives) or solvent-containing. They cure by changing their state of matter (liquid→solid) or by evaporation of the solvent before or during the bonding process and are generally one-component.

The chemically curing one- or more-component reaction adhesives may be based on any polymerization reactions: two-component systems of epoxy resins and acid anhydrides or polyamines react according to polyaddition mechanisms, cyanoacrylates or methacrylates react according to polymerization mechanisms, and systems based on aminoplasts or phenoplasts react according to polycondensation mechanisms.

The range of monomers or polymers which can be employed as adhesive raw materials is widely variable and enables bondings between almost all materials. The bonding of plastic materials tends to be problematic.

The dominant object of current adhesive developments is the conversion from systems containing organic solvents to solvent-free systems or systems containing water as solvent (which is compulsory from ecological and economic points of view).

The fillers or pigments according to the invention are also suitable for the preparation of paints and lacquers. More preferably, the fillers or pigments serve for the preparation of dispersion paints and dispersion dyes. The latter term includes a group of synthetic dyes sparingly soluble in water (in most cases azo dyes or anthraquinone derivatives, also naphthol AS dyes) which are used in a very finely ground state together with dispersing agents for the dyeing and printing of acetate, polyester, polyamide, polyacrylonitrile, PVC and polyurethane fibers. During dyeing, the dye contents, which are dissolved molecularly in the dye bath, penetrate into the fiber by diffusion, where they form a solid solution and thus yield fast dyeings. A modern variant is the so-called transfer dyeing, in which dispersion dyes are transferred thermally from paper onto fabrics.

Thus, it is possible to subject relatively coarse inorganic fillers or pigments to fine milling. The user of the fillers and pigments according to the invention is not bound to particle sizes prescribed by suppliers of the raw materials. In many fields of the prior art, it is usual to characterize finished filler or pigment slurries of suppliers of raw materials by the weight percent of particles which are smaller than 2 µm, for example, as grade, fineness or type 95, 90, 75, 60, 50 etc.

In many fields of technology, the grain size distribution plays a particular role in the use of the fillers or pigments. According to the present invention, it is particularly preferred to employ fillers or pigments having a grain size distribution of from 10 to 99% by weight of particles of <10 µm, especially from 10 to 95% by weight of particles of <1 µm, respectively based on the equivalent diameter.

Particularly preferred according to the present invention are fillers or pigments with a grain size distribution of:

a) from 95 to 100% by weight of particles <20 µm; and/or b) from 50 to 100% by weight of particles <2 µm, especially from 50 to 95% by weight of particles <2 µm; and/or c) from 27 to 99% by weight of particles <1 µm, especially from 27 to 75% by weight of particles <1 µm; and/or d) from 0.1 to 55% by weight of particles <0.2 µm, especially from 0.1 to 35% by weight of particles <0.2 µm; respectively based on the equivalent diameter.

In the following, preferred fields of application for the process according to the invention and the thus obtained fillers or pigments are discussed.

Paint Industry:

The classical formulation of an interior dispersion paint usually contains a proportion of about 10% of a polymer dispersion based on styrene acrylate. A classical façade paint formulation usually has a proportion of from 18 to 25% of a polymer dispersion.

According to the invention, it has been found that the use of a filler slurry coated with a polymer dispersion can reduce the proportion of the total dispersion or the resin proportion in the final formulation while the strength of the formulation is the same as before, or that the strength is significantly increased while the resin proportion in the formulations is the same as before. Thus, in the present case, a standard formulation is adjusted by changing 50% of the binder contained in the formulation. Due to the necessity that a coated calcium carbonate slurry is taken as the basis for the experiments, by analogy, the solids content of the calcium carbonate in the standard formulation is recurred to and modified in the comparative formulation in such a way that the fillers which had previously been added dry to the dispersion are adequately replaced by the same amount of slurry calculated as solids. This has the consequence that two identical formulations are obtained with adequately identical amounts of binders and identical amounts of inorganic fillers. However, in the latter case, a proportion as described above of the previous standard formulation proportion was replaced by the coated carbonate slurry newly designed according to the invention. Thus, it was demonstrated that the strength of the paint is adequately increased as based on the washability according to DIN. The paints prepared by using the fillers or pigments according to the invention had a clearly improved resistance.

In another case, the resin content in the formulation was decreased by 20% by weight as compared to the standard formulation. The remaining 80% by weight of the resins contained in the formulation was replaced by employing, from an absolute point of view, half of this remaining 80% by weight by adding of normal standard dispersion and, in the other half, of carbonate slurry coated according to the invention in accordance with the novel process. In this case too, washability was measured as compared with the standard. The paints prepared using the fillers or pigments according to the invention had a clearly improved resistance.

Adhesive Industry

An adhesive formulation for a typical floor adhesive for bonding textile or other floors classically contains a proportion of 35% of a terpolymeric dispersion with a resin content of 50%.

In the present case, one part of the binder was replaced by one part according to the present invention, so that the total proportion of resin in the formulation remained the same as before, and also the proportion of filler in the formulation remained the same as in the standard. It should be demonstrated that the strength had clearly improved over that of the standard.

The thus prepared formulations were used by performing a bonding with a previously defined standard fitted carpeting on a solid ground and afterwards comparing what force was necessary to delaminate the layers thus bonded with one another. The adhesives prepared by using the fillers and pigments according to the invention have clearly higher delaminating forces.

Paper Industry

In the paper industry, coating paints which contain about 10% by weight of a polymer dispersion (solids) are usually used for surface coating. In the present case, the standard coating paint was based on calcium carbonate with 10% by weight of polymer dispersion (solids). As an alternative, the same formulation was prepared with the same amounts of carbonate and binder, but modifying part of the previous formulation by replacing both the binder and calcium carbonate adequately by calcium carbonate slurry coated according to the invention, wherein the same polymer dispersion which was previously merely added as a component in the formulation was used for coating. Subsequently, the pulling strength of the coating was compared, wherein in both cases a raw paper was coated with about 14 to 15 g/m$^2$ of the above mentioned formulation, either with the standard or with the alternative. The pulling strength shows which coating film is better connected with the raw paper. The pulling strength of the papers using the fillers and pigments according to the invention was clearly improved as compared to the standard fillers and pigments.

Then, with these three examples, it could be demonstrated in terms of application technology that a coating in liquid phase of the inorganic filler gives a clear improvement of the strength values of the coating over the traditional application by merely mixing dispersions and inorganic fillers.

A particularly preferred application of the present invention relates to the use of residual water sludges, especially in the paper industry.

In paper production, losses of coating paints or coating paint components occur which are from 4% by weight to 12% by weight of the material employed.

These residual coating paints or rejects are mainly obtained at position A of FIG. 1:

on the coating aggregates, e.g., by changing the grades, breaks, shutdown and start-up of the plant;

in the processing of coating paints, e.g., in faulty batches, filtering;

in the raw material stock, in the unloading of tank trucks, charging and discharging of containers.

Such interruptions are accompanied by cleaning works, so that the reject waters usually exhibit only low solids contents of around 1 to 2% by weight. The rejects are mostly, as in the present case example, collected without separation in a "residuals collecting container" at position B. At this point, the paper factory can chose different routes, for example:

a) The route to the dump

In most cases, as in the application case described here, the rejects are flocculated, for example, by means of a centrifuge (position C) or sedimentation process (position D), dewatered and brought to maximum solids content (>55%) and "disposed of" in this form on the dump. Valuable starting materials, such as pigments and binders, are lost for the production process.

b) Recycling to the paper coating process by means of the present invention while the quality of the calcium carbonate pigment is increased. Thus, the present invention is integrated into the production cycle of the paper factory.

First, the rejects are flocculated by adding cationic products. The pigments and coagulated binder are separated from the water. Sedimentation means (position D) or decanters (position E) may serve this purpose. Also, the centrifugate from the centrifuge at position C may be used; the clear water obtained is used as production water or is supplied to the processing plant without putting a load on it.

Positions C and D are usually parts of the paper factory, and position E is a part of the present invention. In the application case described here, the concentrated reject from the factory's own sedimentation funnel is added to the milling plant. The latter is composed of the following elements:

| | |
|---|---|
| Pos. F | Buffer container for flocculated and concentrated reject; |
| Pos. G | Silo for $CaCO_3$ powder stock; |
| Pos. H | Mixer for mixtures of dry $CaCO_3$ and reject; |
| Pos. I | Storage container for $CaCO_3$ slurry; |
| Pos. K | two-step ball mill; |
| optionally Pos. L | optionally intermediate container for ready milled $CaCO_3$ slurry. |

The following procedure is followed, as in the application case:

Concentrated reject is collected in the buffer container F. If no reject is obtained, the container is charged with water.

In the mixer H, reject and optionally dispersing agent is charged, and then the $CaCO_3$ powder from silo G is dispersed at 75 to 80% by weight solids.

In the storage container I, the slurry is intermediately stored and supplied continuously to the ball mill K. In the mill, the slurry is milled to the desired fine division with the addition of milling aids. This calcium carbonate slurry is intermediately stored in container L, and subsequently, after checking the particle size, solids content, viscosity and pH value, the same slurry is admixed with polymer dispersion in the coating kitchen, and the thus produced coating paint is transported into the storage container M of the coating plant. When using a continuous operation, the containers F and I can also be dispensed with in the process according to the invention.

When the rejects are reused according to the present invention, the pigments can be theoretically be separated off and recycled alone. However, the process according to the invention also provides for recycling of the binder, for the milling of the pigment with the binder is of critical importance to the quality of the carbonate pigment prepared. It is irrelevant whether the binder is in its original form as a finely dispersed polymer dispersion or in a flocculated, i.e., coagulated, state as a globular cluster, because the binder has its activity potential also as a coagulate. During the milling, the binder is rubbed onto the pigment particles by the mechanical attrition work between the globules of the binder, whether as individual particles or as agglomerate, and converted to a film by the high temperature. Thus, the filler or pigment particles are coated with a binder film.

Thus, this binder proportion is already firmly anchored and can no longer become absorbed in the absorptive substrate (raw paper or raw cardboard). The absorption means loss of binder or deficiency of the coat in binder, and thus, the pulling resistance and print gloss become lower, for example. The absorption can also be effected irregularly if zones with different absorptivity are present in the raw paper. This leads to a mottled printed image.

In contrast, if a filler or pigment is applied to the paper/cardboard which is already coated with binder, as in the process according to the invention, there will be no migration of this binder. The "yield" of the binder is higher; denser coats, a higher pulling resistance and a better print gloss are obtained with using less binder. When the coating pigment is distributed homogeneously, the binder is also distributed homogeneously, which leads to a uniform printing ink reception and counteracts mottle. This has been demonstrated by trials and experience with different binders in the form of both a stabilized polymer dispersion and a destabilized binder, i.e., binder agglomerates.

The performance of the process according to the invention in a usual paper factory can be described as follows:

Silos of any size desired, for example, from 50 to 1000 $m^3$, serve to contain and store dry fillers and pigments having a uniform or optionally different basic grain size distribution, for example, calcium carbonate. Dosing devices ensure the discharging of the filler and/or pigment powder, followed by conveying, optionally to daily service tanks, optionally having purification devices. Dosing devices for the powder or powders, optionally controlled by stored-program controls (SPC) with the electronically integrated formulations, determine by gravimetry and/or volumetry the required amounts of the components to be mixed with water, fresh water or white water from the paper factory. According to the invention, a residual water sludge with a solids content of, in particular, from 0.02 to 50% by weight is employed to replace part or all of the fresh water or white water, optionally with the addition of water when the concentration of the residual water sludge is high. Accordingly, there are further required containers for storing the residual water sludge, dosing devices for the residual water sludge which determine the amount to be employed by gravimetry or volumetry. In addition, there are required containers for receiving the mixture of fresh pigment or fresh filler in the form of a powder, fresh-pigment containing and/or fresh-filler containing slurry and residual water sludge/water, optionally milling aids and dispersing aids or other auxiliaries. For dispersing and stability adjustment, dispersing means (dissolvers) or other agitators are required.

The milling of the surface-modified fillers and pigments can be performed continuously according to the invention in usual agitator ball mills, for example, having a content of from 700 to 5000 l or more. Milling media, preferably milling balls, especially having a diameter of from 1 to 4 mm, are used.

Screens, preferably sieve bends, for separating impurities (ball crushings, separating materials, rust etc.) are usually used for the processing of the residual water sludges. Laser measuring instruments serve to determine and control the milling fineness during the milling process and for the computer-based control of the agitator ball mill plant. Other dosing-injecting means for afterdosing dispersing and milling aids to the agitator ball mill may also be required. After the discharge of the pigment slurry, screens for again separating off pollutants with a size of more than 20 μm may be required. Typically, the fresh pigment and/or filler material employed, especially calcium carbonate powder, has a whiteness in dry form according to DIN 53163 of more than 90%, especially a whiteness of more than 95% with a fineness of $d_{97} \leq 25$ μm, a fineness of not larger than $d_{97} \leq 100$ μm, a carbonate purity of ≥98%, an $SiO_2$ content of ≤1.0%, especially ≤0.2%.

Varying amounts of, for example, carbonate, mixed with polymer dispersion, are milled into a slurry having a solids content which may be adjusted, for example, to that of a ready-to-use coat. Optionally, the solids content may also be adjusted to a higher value if the pigment slurry is to be temporarily stored for an extended period of time. The fineness of the slurry is mainly determined by the dwelling time and/or the energy uptake during the production in the agitator ball mill.

The whiteness of the pigment slurry depends, inter alia, on the mixing ratio of fresh pigment to water or residual water sludge, and especially on the type of fresh pigment employed.

EXAMPLES

In a practical trial, the following examinations could be confirmed:

Paper factory with a papermaking machine and an annual production of 100,000 t of coated paper.
Papermaking machine provided with on-line coating aggregates for precoating and top coating.
Total pigment consumption of 40,000 t, including 20,000 t of $CaCO_3$ of a #60 fineness grade for precoating.
Reject production: 3,200 tons/year.
Capacity of the plant for performing the process according to the invention: 24 tons/day with $CaCO_3$ (#60 fineness*).
Object: Milling of 20 t of fine pigment with 1 t of reject for a solids content of 75% by weight.
(#60 fineness means a proportion of 60% by weight of particles smaller than 2 μm)

The integration of the milling plant begins with the collection of the already flocculated rejects condensed to about 40% by weight in buffer container F which already contain the polymer dispersion.

In the mixer H, the reject as well as dispersant were charged, and dry $CaCO_3$ (30 grade) was supplied from silo G until 75% by weight of solids is achieved. The suspension obtained was pumped into storage container I, where 1.8% by weight of a commercially available milling aid (polyacrylate) was added, based on the pigment.

Now, the two-step ball mills K were continuously fed from storage container I. The 30 grade $CaCO_3$ was milled to 60 grade $CaCO_3$. For the milling, 85 kW had to be used per ton. The thus prepared 60 grade slurry was stored in the intermediate container L until the particle size, viscosity, solids content and pH value were established, and then pumped into storage container M for the precoating pigment of the coating kitchen. Subsequently, this precoating pigment was also mixed with about 16% by weight (commercial product) of a commercially available polymer dispersion (Acronal®) to obtain a precoating paint.

In the application case described here, the precoating paint in the operational trial was composed of 60% by weight of standard 60 fineness grade carbonate plus 40% by weight of 60 fineness grade AlphaCarb®, the latter proportion of 40% by weight consisting of 15% by weight of reject and 25% by weight of 30 fineness grade $CaCO_3$, so that the proportion of reject in the precoating paint was at about 7% by weight of reject. At a coating speed of 820 m/min, 10-11 g/m²/side was applied on the film press in the precoating. The flowing behavior of the coating paint on the film press was unobjectionable, and the top coat was applied without streaks.

The thus coated test production was compared with standard coated paper.

Result:

As compared with coatings with the standard 60 grade pigment, coatings with the pigment according to the invention yielded:

a higher pulling resistance in an offset test of score 1 as compared to score 2;
a higher printing ink gloss of 82 as compared to 75;
a slower absorption behavior of the printing ink by about 15 s after the Prüfbau absorption test;
a better printing uniformity (evaluated visually) of score 2 as compared to score 3.

Also, in the optical and sensory testing using papers prepared by the process according to the invention, an excellent quality was established for the test papers.

Examples of the Milling of CaCO3 with Coating Paint

For preparing a calcium carbonate pigment slurry with a fines content of more than 90% by weight of <2 μm, an aqueous anionic copolymer dispersion based on n-butyl acrylate, acrylonitrile and styrene which was free from softeners and solvents (Acronal® S360 D) was employed in a ball mill using Calcicell® 30. This polymer dispersion had a solids content of about 50% by weight and a pH value of about 8.

The quantity of calcium carbonate Calcicell® 30 in the slurry was 75% by weight. As the milling balls, SAZ balls with diameters of 1.6 to 2.5 mm were employed. The effective volume of the mill was 3 l. The power was 1.3 kW at a rotations per minute of from 400 to 1500 rpm.

To the calcium carbonate and water in the amounts mentioned in Table 1, a concentrated coating paint (68.7% by weight solids content) was added. To prepare the slurry, 1% by weight each of the above mentioned polymer dispersion (calculation base: filler proportion) was added to the charges.

The following Table 1 shows the experimental program:

TABLE 1

| Example | Water | Coating paint | Filler Calcicell ® 30 |
|---|---|---|---|
| 2 | 500 g | 0 g | 1500 g |
| 3 | 971 g | 29 g | 3000 g |
| 4 | 706.5 g | 43.5 g | 2250 g |
| 5 | 663 g | 87 g | 2010 g |
| 6 | 619.5 g | 130.5 g | 1890 g |
| 7 | 576 g | 174 g | 1320 g |

The fineness of the materials employed was determined by the laser diffraction method with a Cilas device:

Measurement of the Raw Calcium Carbonate Employed:

| | |
|---|---|
| D50 | 4.63 μm |
| D100 | 27.83 μm |
| <1 μm | 15.30% |
| <2 μm | 30.20% |

Measurement of the Coating Paint Employed:

| | |
|---|---|
| D50 | 1.17 µm |
| D100 | 9.95 µm |
| <1 µm | 41.50% |
| <2 µm | 76.10% |

Example 2

The following analytical results were obtained with pure water:

| | |
|---|---|
| Ball volume: | 2.0 l |
| Slurry volume: | 0.9 l |
| Revolutions per minute: | about 1100 rpm |

The samples for measuring the grain size distribution were taken after 20, 40, 60, 80, 100 and 120 min. During the milling trial, the mill was cooled with water.

TABLE 2

Evaluation of the Cilas 850/1 measurements:

| Time/min | D50/µm | D100/µm | <2 µm/% |
|---|---|---|---|
| 20 | 1.85 | 8.98 | 53.4 |
| 40 | 1.70 | 7.97 | 58.2 |
| 60 | 1.31 | 5.96 | 73.0 |
| 80 | 1.13 | 4.48 | 81.9 |
| 100 | 1.04 | 4.46 | 84.9 |
| 120 | 1.20 | 7.84 | 81.6 |

Color Values (Elrepho Measuring Device) of the Filler from the After 120 min:

| | | | |
|---|---|---|---|
| Rx = 90.3 / | Ry = 90.1 / | Rz = 88.8 / | BGW = −1.7 |

Viscosity Measurement (Sample after 120 min):

| | |
|---|---|
| Temperature: | 20° C. |
| Viscometer: | Brookfield HBTD |

TABLE 3

Spindle 2:

| Speed | 100 | 50 | 20 |
|---|---|---|---|
| Readout | 2.2 | 1.0 | 0.4 |
| Viscosity | 70.4 mPa · s | 64.0 mPa · s | 64.0 mPa · s |

Example 3

TABLE 4

Evaluation of the Cilas 850/1 measurements:

| Time/min | D 50/µm | D 100/µm | <2 µm |
|---|---|---|---|
| 20 | 1.83 | 8.96 | 53.9 |
| 40 | 1.52 | 6.97 | 63.2 |
| 60 | 1.27 | 6.43 | 72.8 |
| 80 | 1.09 | 4.97 | 80.3 |

TABLE 4-continued

Evaluation of the Cilas 850/1 measurements:

| Time/min | D 50/µm | D 100/µm | <2 µm |
|---|---|---|---|
| 100 | 1.00 | 4.48 | 84.2 |
| 120 | 0.97 | 4.47 | 85.3 |
| 130 | 0.97 | 3.99 | 86.5 |
| 140 | 0.97 | 4.43 | 86.1 |

Example 4

TABLE 5

Evaluation of the Cilas 850/1 measurements:

| Time/min | D50/µm | D100/µm | <2 µm |
|---|---|---|---|
| 20 | 1.81 | 10.0 | 54.3 |
| 40 | 1.51 | 8.0 | 64.9 |
| 60 | 1.27 | 8.0 | 75.0 |
| 80 | 1.15 | 7.0 | 80.7 |
| 100 | 1.08 | 4.96 | 84.1 |
| 110 | 1.03 | 4.48 | 85.9 |

Color Values (Elrepho Measuring Device) of the Filler from the Slurry after 110 min:

| | | | |
|---|---|---|---|
| Rx = 92.2 / | Ry = 92.0 / | Rz = 90.7 / | BGW = −1.6 |

Viscosity Measurement (Sample after 110 min):

| | |
|---|---|
| Temperature: | 20° C. |
| Viscometer: | Brookfield HBTD |

TABLE 6

Spindle 2:

| Speed | 100 | 50 | 20 |
|---|---|---|---|
| Readout | 2.0 | 1.1 | 0.4 |
| Viscosity | 64.0 mPa · s | 70.4 mPa · s | 64.0 mPa · s |

Example 5

TABLE 7

Evaluation of the Cilas 850/1 measurements:

| Time/min | D50/µm | D100/µm | <2 µm |
|---|---|---|---|
| 20 | 1.94 | 9.96 | 51.1 |
| 40 | 1.53 | 7.96 | 64.2 |
| 60 | 1.32 | 6.94 | 72.7 |
| 80 | 1.20 | 7.65 | 77.5 |
| 100 | 1.08 | 4.97 | 80.6 |
| 120 | 0.99 | 3.98 | 87.6 |

Color Values (Elrepho Measuring Device) of the Filler from the Slurry after 120 min:

| | | | |
|---|---|---|---|
| Rx = 92.4 / | Ry = 92.2 / | Rz = 90.9 / | BGW = −1.6 |

Viscosity Measurement (Sample after 120 min):

| Temperature: | 20° C. |
|---|---|
| Viscometer: | Brookfield HBTD |

TABLE 8

| Spindle 2: | | | |
|---|---|---|---|
| Speed | 100 | 50 | 20 |
| Readout | 1.7 | 0.8 | 0.3 |
| Viscosity | 54.4 mPa·s | 51.2 mPa·s | 48.0 mPa·s |

Example 6

TABLE 9

| Evaluation of the Cilas 850/1 measurements: | | | |
|---|---|---|---|
| Time/min | D50/µm | D100/µm | <2 µm |
| 20 | 1.77 | 9.96 | 55.5 |
| 40 | 1.47 | 8.91 | 65.8 |
| 60 | 1.26 | 6.95 | 74.5 |
| 80 | 1.15 | 4.98 | 80.2 |
| 100 | 1.06 | 4.96 | 84.3 |
| 120 | 1.02 | 4.92 | 86.4 |

Slight oversize on 40 µm screen, foaming, slight agglutination of the balls.

Color Values (Elrepho Measuring Device) of the Filler from the Slurry after 120 min:

| Rx = 91.7 | / | Ry = 91.6 | / | Rz = 90.4 | / | BGW = −1.4 |
|---|---|---|---|---|---|---|

Viscosity Measurement (Sample after 120 min):

| Temperature: | 20° C. |
|---|---|
| Viscometer: | Brookfield HBTD |

TABLE 10

| Spindle 2: | | | |
|---|---|---|---|
| Speed | 100 | 50 | 20 |
| Readout | 1.3 | 0.6 | 0.3 |
| Viscosity | 41.6 mPa·s | 38.4 mPa·s | 48.0 mPa·s |

Example 7

TABLE 11

| Evaluation of the Cilas 850/1 measurements: | | | |
|---|---|---|---|
| Time/min | D50/µm | D100/µm | <2 µm |
| 20 | 1.72 | 8.96 | 57.2 |
| 40 | 1.47 | 7.94 | 67 |
| 60 | 1.28 | 5.95 | 74.7 |
| 80 | 1.21 | 5.46 | 77.7 |
| 100 | 1.18 | 5.96 | 77.9 |
| 120 | 1.02 | 4.95 | 86.3 |

More oversize on the 40 µm screen than in Example 6. More foaming and stronger agglutination of the balls.

Color Values (Elrepho Measuring Device) of the Filler from the Slurry after 120 min:

| Rx = 90.6 | / | Ry = 90.4 | / | Rz = 89.1 | / | BGW = −1.7 |
|---|---|---|---|---|---|---|

Viscosity Measurement (Sample after 120 min):

| Temperature: | 20° C. |
|---|---|
| Viscometer: | Brookfield HBTD |

TABLE 12

| Spindle 2: | | | |
|---|---|---|---|
| Speed | 100 | 50 | 20 |
| Readout | 1.3 | 0.6 | 0.3 |
| Viscosity | 41.6 mPa·s | 38.4 mPa·s | 48.0 mPa·s |

TABLE 13

| Evaluation of the Cilas 850/1 measurements: | | | |
|---|---|---|---|
| Time/min | D50/µm | D100/µm | <2 µm |
| 20 | 2.14 | 10.96 | 47.4 |
| 40 | 1.72 | 8.96 | 57.2 |
| 60 | 1.36 | 7.92 | 69.9. |
| 80 | 1.24 | 7.83 | 76.2 |
| 100 | 1.16 | 4.98 | 80.3 |
| 120 | 1.08 | 4.96 | 84.9 |

Color Values (Elrepho Measuring Device) of the Filler from the Slurry after 120 min:

| Rx = 92.0 | / | Ry = 91.8 | / | Rz = 90.9 | / | BGW = −1.2 |
|---|---|---|---|---|---|---|

Viscosity Measurement (Sample after 120 min):

| Temperature: | 20° C. |
|---|---|
| Viscometer: | Brookfield HBTD |

TABLE 14

| Spindle 2: | | | |
|---|---|---|---|
| Speed | 100 | 50 | 20 |
| Readout | 1.1 | 0.4 | 0.2 |
| Viscosity | 35.2 mPa·s | 25.6 mPa·s | 32.0 mPa·s |

What is claimed is:

1. A process for making paper or cardboard, comprising applying a slurry comprising a surface modified inorganic pigment selected from calcium carbonate, precipitated calcium carbonate, china clay, and talcum_as a component of the coat in paper making, the process further comprising the step of preparing the slurry by a process comprising the steps of:
   milling the pigment to a grain size distribution of from 10 to 95% by weight of particles of <1 µm, based on the equivalent diameter; and
   coating the pigment while milling with a binder composition comprising a polymer dispersion and a dispersing agent, wherein:

(a) the polymer dispersion comprises an unmodified polymer particle selected from natural rubber, synthetic rubber, polyurethane, styrene/butadiene, styrene/acrylic acid or acrylate ester, styrene/butadiene/acrylic acid or acrylate ester, and vinyl acetate/acrylic acid or acrylate ester, in a solids amount of from 5 to 15% by weight, based on said pigment; and (b) the dispersing agent is present in an amount of 0.1 to 2.0% by weight, based on the pigment;

whereby the polymer particle is rubbed onto the pigment to form a film.

2. The process according to claim 1, characterized in that pigment slurries having pigment content of from 10 to 90% by weight, based on the slurry, are employed.

3. The process according to claim 1, wherein polymer dispersions are employed wherein the polymer particles have a particle size of from 0.05 to 6 μm in aqueous or non-aqueous phases.

4. The process according to claim 1 wherein said pigments are contacted with polyacrylates.

5. The process according to claim 1, characterized in that pigment slurries having a pigment content of from 30 to 70% by weight, based on the slurry, are employed.

6. The process according to claim 1, wherein the pigment comprises calcium carbonate.

7. The process according to claim 1, wherein the dispersing agent is selected from polyacrylates.

8. The process according to claim 7, wherein the polyacrylate is present in an amount of 0.2 to 0.4% by weight, based on the pigment.

* * * * *